United States Patent [19]
Fisher et al.

[11] 4,158,483
[45] Jun. 19, 1979

[54] REMOTE CONTROLLED REARVIEW MIRROR

[75] Inventors: Robert J. Fisher, Detroit; Jeffrey R. Seaman, Rochester, both of Mich.

[73] Assignee: Harman International Industries, Inc., Southfield, Mich.

[21] Appl. No.: 655,135

[22] Filed: Feb. 3, 1976

Related U.S. Application Data

[63] Continuation-in-part of Ser. No. 594,245, Jul. 9, 1975, abandoned.

[51] Int. Cl.² .............................................. G02B 5/08
[52] U.S. Cl. .................................... 350/289; 74/89.14
[58] Field of Search ........................... 350/289, 6, 285; 74/501 M, 89.14, 89.15; 248/479, 481, 483, 487

[56] References Cited

U.S. PATENT DOCUMENTS

| 3,613,464 | 10/1971 | Archer | 74/501 M X |
| 3,972,597 | 8/1976 | Repay et al. | 350/289 |

*Primary Examiner*—F. L. Evans
*Attorney, Agent, or Firm*—Everett R. Casey

[57] ABSTRACT

An electrically powered remote control rearview mirror for a vehicle in which the mirror is pivotally supported for rotation about either or both of two mutually perpendicular axes, with the pivotal drive forces being exerted through the pivot mechanism and with the drive means for transmitting the pivotal forces automatically declutching in response to efforts to drive the mirror beyond preselected limit positions or in response to manual manipulation of the mirror itself.

16 Claims, 21 Drawing Figures

REMOTE CONTROLLED REARVIEW MIRROR

CROSS REFERENCE

This is a continuation-in-part of our similarly entitled application Ser. No. 594,245 filed July 9, 1975, now abandoned.

SUMMARY OF THE INVENTION

The present invention derived from an effort to create an electrically controlled remote control mirror which was rugged, accurate, satisfactorily waterproof, essentially vibration-sensitivity free, and simple of manufacture. During the course of the development, it was discovered that certain principles could be applied which had previously been employed by the assignee company in a different manner and for a different purpose. Thus, the company had previously marketed, under the Harman-Kardon name, certain high fidelity four-channel stereo equipment utilizing a universally pivotal knob which varied the position of a pair of arcuate members rotatable about mutually perpendicular axes, with those arcuate members driving suitable variable resistance elements to selectively vary the effective gain of each of the four-channel circuits to provide a desired balance of the sound energy from each of the four loudspeaker assemblies. During the course of the development, the applicants conceived of an adaptation of that principle in which a pair of driven rotatable arcuate elements were employed to convert rotational forces applied thereto into pivotal movement of a mirror. A structure was developed to couple the pivotal mirror assembly to the crossed arcuate members in a manner to satisfactorily preclude vibrational movement of the mirror relative to the crossed arcuate members as an element of a design for providing a mirror satisfactorily immune to distortion of image due to vibration produced either mechanically or as a result of varying wind forces. The drive means for rotating the arcuate members was also developed to aid in the dampening of undesired movement of the mirror while yet establishing a limit to the maximum restraint of relative movement between the mirror glass and the power source, so as to establish a selective clutching capability to permit selective decoupling in response to the application of forces, in either direction along the drive train, to which other elements of the drive train could not properly respond.

DESCRIPTION OF THE INVENTION

The principles of the present invention are representatively embodied in an outside rearview vehicular mirror, for use on automobiles or the like, in which the driver is provided with an actuating knob which he can manipulate to tilt a reflective mirror glass about substantially horizontal and vertical axes. The disclosed embodiment is an electrically powered mirror employing one electric motor, or equivalent to power rotate the mirror about a vertical axis and a second electric motor, or equivalent, to power rotate the mirror about a horizontal axis, although it is contemplated that a single motor may be employed, if desired, using a solenoid, or equivalent, to shift the single motor between vertical and horizontal drive trains.

Figure 1:
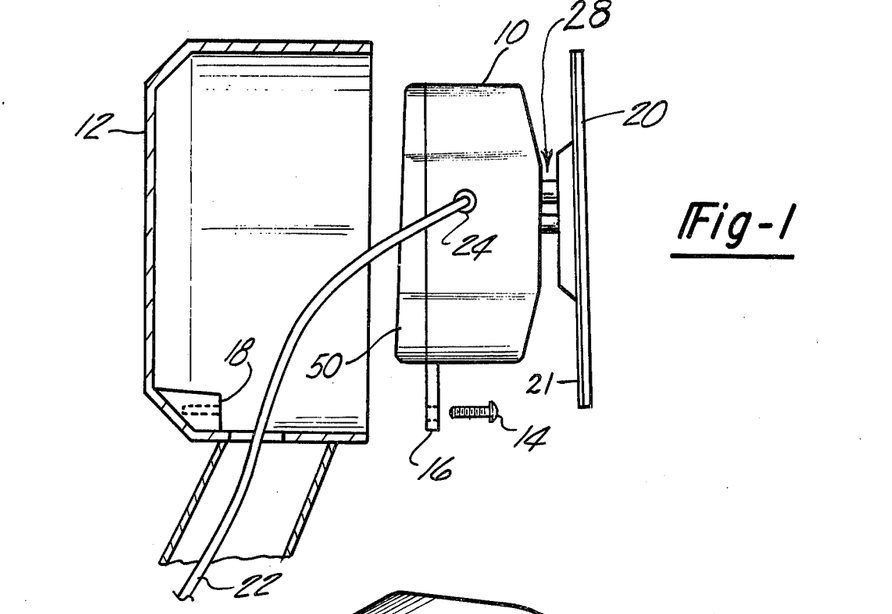
FIG. 1 is an exploded elevational view, in partial section, of a completed mirror assembly embodying certain of the principles of the present invention.
Figure 2:
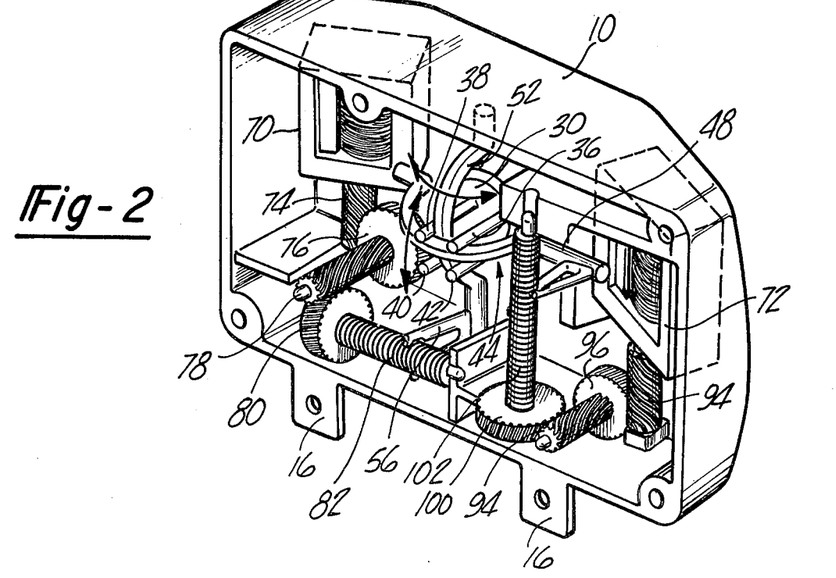
FIG. 2 is a perspective view of the operational elements of the mirror.

Referring to FIG. 1, the operating elements of the power actuated mirror are housed within a case or housing 10, made of plastic or the like, which is seatable within the cavity of an open faced mirror shell 12 and may be secured therewithin by means such as screws 14 passing through apertured tabs 16 in housing 10 and engaging tapped bosses 18 in shell 12. Reflective mirror member 20, which may be provided with a plastic or metallic backing or case 21, as in customary practice, is pivotally supported on housing 10 and, when the mirror is fully assembled, is bounded by the inner surface of the open face of the shell 12 and is pivotable therewithin. An electrical cable 22, carrying a plurality of electric wires for supplying power to the electric motors witin the housing 10, extends through the housing 10 and is provided with a seal 24 to prevent the entrance of water into the housing 10 around the cable 22. Cable 22 extends to the battery of the vehicle under the control of a manual switch (not shown) provided at a position readily accessible to the driver. The switch may, for example, be a bat handled double pole double throw switch with a neutral position, in each of vertical and horizontal senses of movement, movement of the handle from the neutral position in a vertical tilting sense (referred to the mirror glass) producing energization of a vertical drive motor in one polarity to tilt the mirror upwardly (about a horizontal axis), movement of the handle from neutral position in a downward tilting sense energizing the same motor in reverse polarity, movement of the handle to the left energizing a horizontal drive motor in a polarity to produce the requisite leftward pivotal swinging of the mirror, and movement of the handle in the opposite horizontal sense energizing that horizontal drive motor in reverse polarity to produce the requisite rightward pivotal swinging of the mirror glass in a horizontal sense (about a vertical axis). Concurrent movement of the handle in both vertical and horizontal senses produces concurrent energization (with appropriate polarity) of both of the motors to produce concurrent movement of the mirror in both vertical and horizontal senses for rapid adjustment to the position preferred by the driver.

Figure 3:
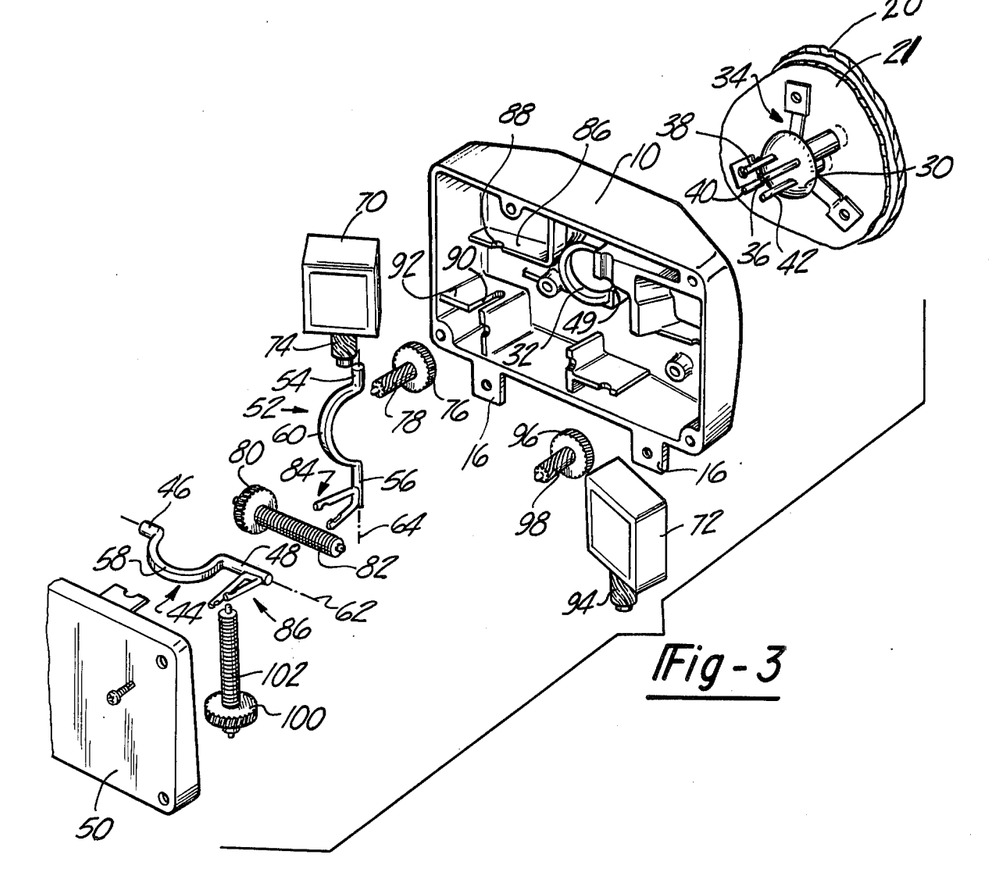
FIG. 3 is a view corresponding to FIG. 2, but with the parts separated for clarity of understanding.

The mirror 20 (FIGS. 3 and 5) is secured in any suitable manner upon a ball stud assembly 28 which is integral with a generally hemispherical ball 30 forming a first portion of a ball and socket joint. Stud assembly 28 representatively comprises thru studs (at 120° spacing) the ends of which are staked within the mirror case 21 (FIG. 3). Ball 30 pivotally engages a socket portion 32 which is illustrated to be formed integrally with the body of housing 10. Ball 30 is spring biased into frictional engagement with socket 32 by a spring assembly 34 having a central portion pressing on a spherical boss 33 on stud 30, and three arms projecting radially and terminating in pads which are secured in any suitable fashion to the outer face of the case 10. The center of the spherical surface 33, identified at 35, is also the center of the spherical surface of ball 30 and hence is the point about which the mirror assembly 20 rotates. The biasing force of the spring 34 is intended to be sufficient to establish frictional engagement between the ball and socket to aid in steadying the mirror against vibrational forces and to assist in holding it in selected position. That spring force also establishes an effective (in the sense of adequate, under commercial standards) watertight seal between the ball 30 and the socket 32. In the illustrated arrangement, the ball is provided with a spherical surface and the socket is provided with a conical surface, to provide line contact between the two. It is contemplated that the socket can also be made spherical to increase the area of engagement, if desired. It is further contemplated that a rubber boot may be secured between the face of the housing 10 and the mirror 20, surrounding the ball stud assembly 28, to provide improved water sealing, if that proves desirable in any given commercial installation.

Mirror 20 is pivoted about the effective center of the spherical surface of ball 30. Forces must be exerted to produce that tilting. In a number of prior arrangements, this is accomplished by applying forces to the mirror 20 (or to the mirror case secured to the reflective element) eccentrically to the central point of the mirror. For example, wires or strings may be secured to the mirror 20 and extend through a counterpart of the adjacent face of case 10 in a line generally parallel to the line interjoining the center of the mirror and the center of ball 30. Screwjacks may be used, similarly located. However, with an electrically operated unit, it is particularly important that the operating mechanism be satisfactorily sealed against the ingress of water, and in the disclosed arrangement the forces to tilt the mirror are exerted directly through the ball 30 assembly itself. Accordingly, no operating mechanism projects from the case 10 except solely for the assembly including ball 30, so that, with sealing of the case and of the stationary electrical cable 22, and with the creation of an effective water seal at the ball and socket fitting, as discussed, satisfactory water sealing of all of the operating elements can be achieved.

A tail piece assembly, illustratively in the form of four actuating pins or arms 36, 38, 40 and 42, is secured to the ball 30. In the preferred arrangement, ball 30, the studs 28, and the arms 36–42 are integrally molded of suitable plastic.

A horizontally disposed vertical drive arm 44 (FIG. 3) is provided with a pair of co-axial spaced apart circular cylindrical bearing surfaces 46 and 48 which are rotatably supported within corresponding appropriate bearing surfaces in the case 10 and case cover 50. For example, cylindrical surface 48 seats in a semi-cylindrical bearing cavity 49 in case 10 (FIG. 3) and a corresponding semi-cylindrical bearing surface, constituting the other half of the surrounding bearing, is provided (not shown) on the adjacent face of cover 50. Correspondingly, a vertically disposed horizontal drive arm 52 is provided with co-axial circular cylindrical bearing surfaces 54 and 56 which are suitably supported in bearing surfaces in case 10 and cover 50.

Figure 4:
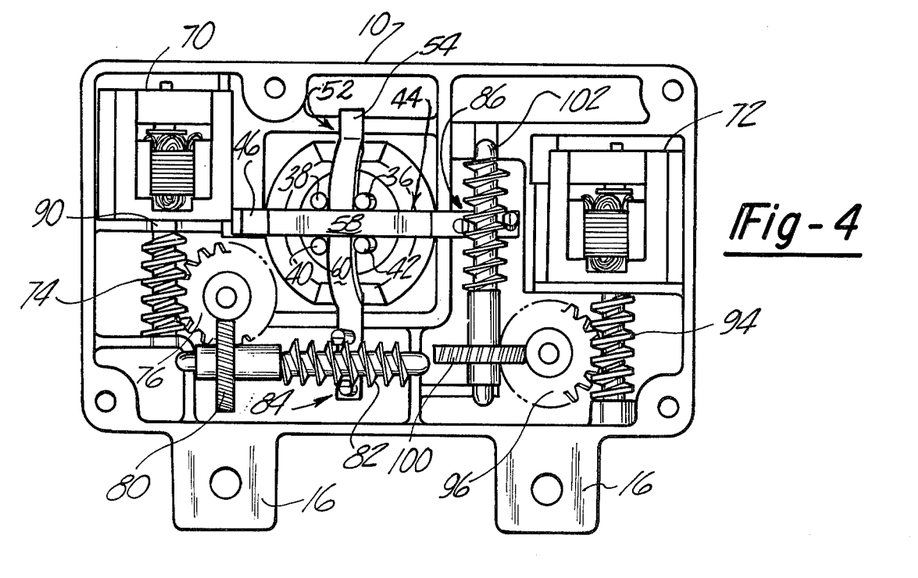
FIG. 4 is an elevational view of the structure of FIG. 2.

Drive members 44 and 52 are provided with central arcuate portions 58 and 60, respectively. As may be seen in FIG. 4, the arcuate portion 58 of drive arm 44 is trapped between actuating arms or fingers 36 and 38, on one side of drive arm 44, 40 and 42, on the other side of that drive arm. Correspondingly, the arcuate middle portion 60 of drive arm 52 is trapped between actuating arms or fingers 36 and 42, disposed to one side of drive arm 52, and 38 and 40 disposed to the other side of that drive arm. Accordingly, as drive arm 44 is rotated about its axis of rotation 62 (FIG. 3), forces are exerted through the appropriate pair (depending upon the direction or rotation) of the actuating arms 36–38 or 40–42 to rotate ball 30 about a horizontal axis through point 35 (FIG. 5) to produce upward or downward vertical tilting of the mirror 20. Correspondingly, when drive arm 52 is rotated about its rotational axis 64, forces are exerted through the appropriate pair of actuating arms (in the direction of the force) 36–42 or 38–40 to pivot ball 30 about a vertical axis through point 35. It is to be understood that the terms horizontal and vertical are employed herein with reference to the attitude of the assembly in the drawings, it being recognized that the pivoting may not necessarily be parallel and perpendicular to the horizon when the mirror is mounted on a vehicle.

In the illustrated arrangement, pivot axis 64 (FIG. 5) is disposed proximate the rotational center 35 of ball 30, while rotational axis 62 of drive member 44 is disposed somewhat further away from point 33. Accordingly, arcuate portion 58 of drive arm 44 clears arcuate portion 60 of drive arm 52 even though, as is preferred for economy of manufacture, parts 44 and 52 are identical. While the arcuate portions 58 and 60 of the drive arms need not be in the shown (FIG. 3) circular configuration, deviations from the circular pattern will result in changes in the rate of movement of the mirror, with a given drive rate of the powering electric motor, during the pivoting.

Drive arm 52 is rotated about its axis of rotation 64 by a power source in the form of an electric motor 70, while drive arm 44 is rotated about its axis 62 by a power source in the form of electric motor 72. In usual practice, drive motors will be twelve-volt reversible d.c. motors. The drive train from electric motor 70 includes pinion 74, secured to and driven by electric motor 70, a worm gear 76 driven by pinion 74, a worm 78, integral and rotated with, gear 76, worm gear 80 engaging and driven by worm 78, worm 82, integral and driven with, gear 80, and coupling means 84 engaging worm 82 and converting rotation of worm 82 into rotation of drive arm 52 about axis 64. Coupler 84 is in the nature of a modified worm gear or worm follower, as will be described. Suitable bearings are provided in case 10 and cover 50 for bearingly supporting the various elements of the drive train. For example, motor 70 rests upon a web 86 (FIG. 3) with an unthreaded portion of the pinion shaft 74 adjacent the motor being bearingly supported in a bearing, one portion of which is illustrated at 88 in FIG. 3 and the other portion of which (not shown) is on cover 50, and with the lower unthreaded portion of pinion 74 being bearingly supported in slot 90 formed in web 92 in case 10.

Correspondingly, the drive train from motor 72 includes pinion 94, which drives worm gear 96, which is integral with worm 98, which drives worm gear 100, which is integral with worm 102, which drivingly cooperates with coupling means 86, which is integrally formed on drive arm 44, so that rotation of motor 72, in either direction, produces rotation of drive arm 44 in either of the two senses, as selected.

It may be noted that the illustrated arrangement is designed so that all elements of the drive train for pivoting the mirror horizontally are identical to the corresponding parts for pivoting the mirror vertically.

Figures 5, 6, 7, 8:
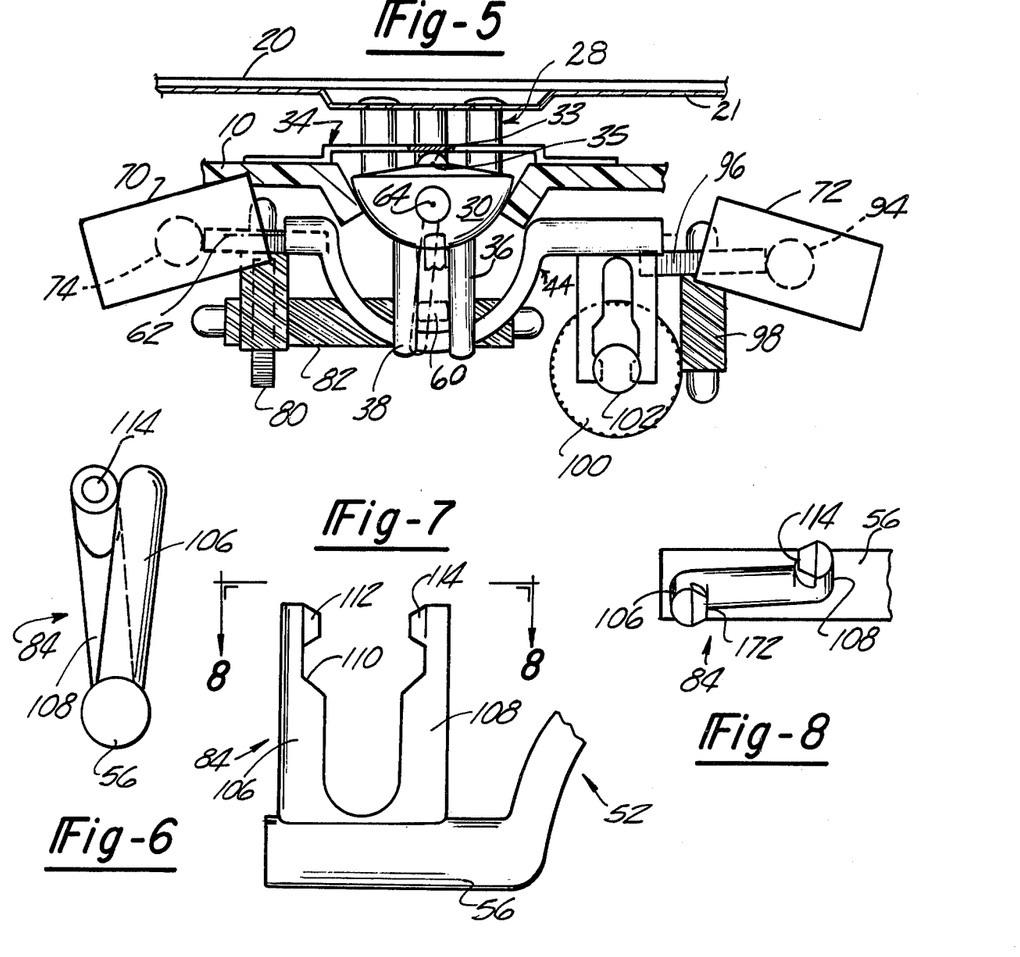
FIG. 5 is a horizontal sectional view, looking downwardly, taken of FIG. 2 with the top of the housing deleted.
FIG. 6 is a detailed fragmentary view, taken from one end, of one of the driving and clutching elements.
FIG. 7 is a fragmentary front elevational view of the structure of FIG. 6.
FIG. 8 is a sectional view taken substantially along the line 8—8 of FIG. 7.
Figure 9:
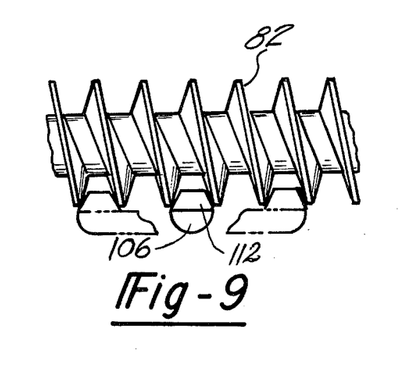
FIG. 9 is a representation, in plan, of the relationships between one of the elements of FIG. 7 and a part with which it cooperates, under central and extreme conditions.
Figure 10:
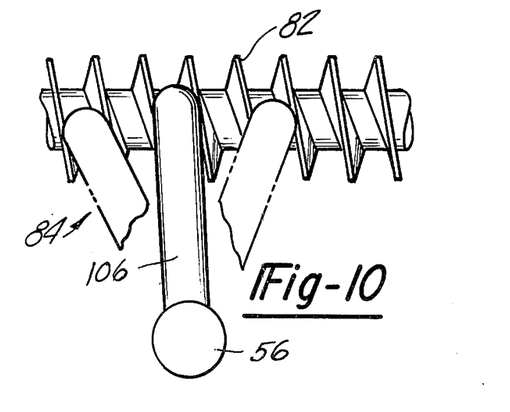
FIG. 10 is a representation, in elevation, of the relation of the parts of FIG. 9.
Figures 11, 12, 13, 14, 15:
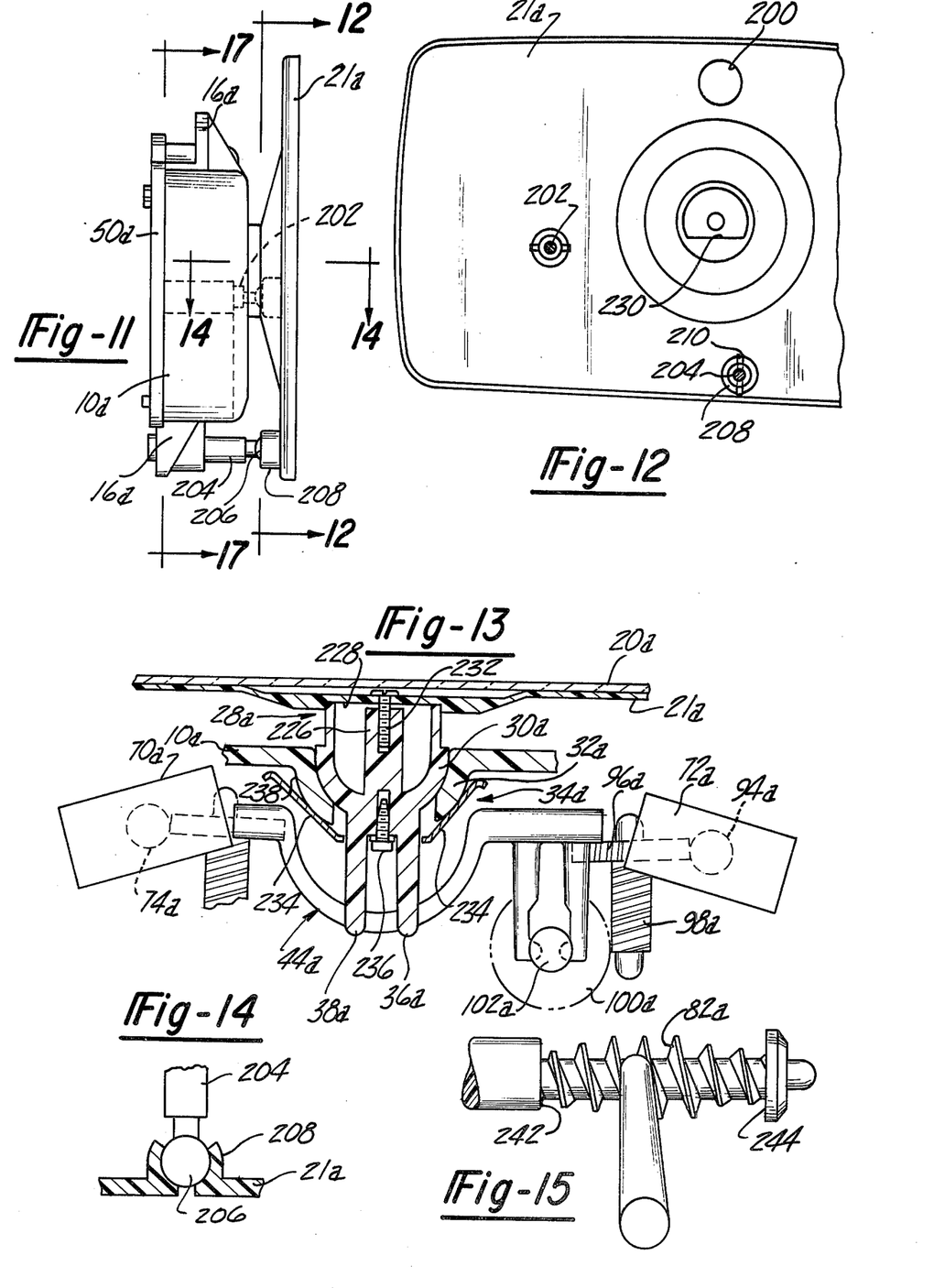
FIG. 11 is an elevational view of a mirror and power housing assembly embodying certain of the principles of the present invention.
FIG. 12 is a fragmentary sectional view taken substantially along the line 12—12 of FIG. 11.
FIG. 13 is a fragmentary sectional view taken substantially along the line 13—13 of FIG. 11.
FIG. 14 is a fragmentary sectional view taken substantially along the line 14—14 of FIG. 12.
FIG. 15 is an enlarged fragmentary view of a portion of the internal structure of the mirror of FIG. 11, shown in position in FIG. 17.

Assembly 84, which is molded as an integral part of drive arm 52, is bifurcated, comprising first and second parallel and facing cam follower arm portions 106 and 108 (FIG. 7). Arm 106, provided with a worm clearance step 110, terminates at its free end in a cam follower 112. Correspondingly, arm 108 terminates in cam follower 114. Cam or worm followers 112 and 114 constitute opposing teeth engageable with the thread of worm 82 (FIGS. 9 and 10). The faces of worm followers 112 and 114 which engage the thread are conformed in a generally frusto-conical manner to provide appropriate matching with the configuration of the abutting faces of the thread of the worm 82. As may best be seen in FIGS. 6 and 8, the arms 106 and 108 are disposed at an angle to one another to position the surfaces 112 and 114 to concurrently engage the thread of the worm 82 on essentially opposite sides thereof.

As motor 70 is energized to drive worm 82 via elements 74, 76, 78 and 80, cams 112 and 114 are advanced, to the left or to the right, along the thread of worm 82 so as to rotate cam follower assembly 84 about axis 64 to correspondingly rotate the arcuate portion 60 of drive member 52. Therefore, ball 30 is pivoted about a vertical axis through pivot point 35 by the forces exerted by arcuate portion 60 on the actuating arms or pins 38-40 or 36-42, depending upon the direction of rotation of the worm 82.

The spacing between the arms 106 and 108, considering their angle of respective tilt, is selected so as to provide an interference fit between the cams 112-114 and the thread of the worm 82. Accordingly, when the parts are assembled, one or both of the arms 106 and 108 is slightly distorted from its free position (illustrated in FIGS. 6-8) to exert a continuing resilient force tending to maintain cams 112 and 114 firmly in engagement with the thread of the worm 82 (see FIGS. 9 and 10). Therefore, by holding the longitudinal position of worm 82 essentially fixed by appropriate thrust bearing means, the position of arms 106-108, and hence the rotational position of drive arm 52, is essentially fixed during all periods in which worm 82 is not being rotated. Similarly, drive arms 58 is held quite firmly in position, when motor 72 is not energized, by virtue of its corresponding cooperation with its respective drive train.

Those facts may be employed to aid in reducing the effects of vibration upon the mirror 20. Thus, mirror 20, when utilized an an element of an outside of an outside rearview mirror for a vehicle, is subject to vibrational forces due both to the effects of wind and to vibration of the vehicle from the road. As a result, there is a tendency for the mass of the mirror 20 to vibrate relative to the remainder of the vehicle, tending to produce a slightly blurred image. Vibration of the mirror 20 relative to the housing 10 is impeded in part by the frictional engagement between the ball 30 and the socket 32 under the action of spring 34. Further, a rigidifying effect is achieved by establishing a clamping relationship between the actuating arms or pins 36-42 and the drive arms 44 and 52. Thus, the distance between pins 36 and 38 (FIG. 4) is preferably selected such that there is an interference fit between those pins and the actuating arm 60, that is, the free distance between the pins 36 and 38 slightly (0.005 inches or more) less than the width of the arcuate portion 60 of the drive arm 52, and the same considerations apply to pins 40 and 42. Correspondingly, the distance between pins 38 and 40, as well as the distance between pins 36 and 42, is selected to provide an interference engagement with the arcuate portion 58 of the drive arm 44. The magnitude of the interference fit should not be so great as to unduly increase the frictional force impeding sliding movement between the pins 36-42 and the arcuate portions 58 and 60 during the adjustment of the mirror. That factor, and hence the extent of the interference fit, will vary in accordance with the type of plastic, or other material, of which the parts are made.

With reference to FIGS. 6-9, as above noted, the coupling means 84 and 86 are designed to create a static force tending to prevent rotation of drive arms 52 and 44, about their axes 64 and 62, relative to worms 82 and 102, respectively. However, the purpose of making arms 106 and 108 effectively in the form of projecting cantilever beams is to permit the coupling means to serve not only as a force transmitting means (to convert rotation of worm 82 or 102 into rotation of drive arm 52 or 44), but also to serve as an overload or slip clutch under certain conditions. Those conditions are primarily twofold. First, a driver may place his fingers directly on the glass 20 and manually tilt that glass horizontally or vertically to a new position. That force would produce pivotal movement of ball 30 and hence rotational motion of drive arm 44, or drive arm 52, or both. Yet worms 82 and 98 may well be stationary. The clutch means is provided to permit the development of excessive forces in the system under that condition and to permit the driver to manually adjust the mirror if he chooses.

Further, when motor 70 or 72 is energized, the mirror 20 is pivoted in a selected sense. The system is designed for a certain permitted angle of tilt of the glass. In a constructed embodiment, provision was made for a 15 degree tilt of the glass from its centered position in each of the four senses, that is, for a 30 degree total angle of vertical and horizontal tilting. However, at the limit of that tilting, limit stop means is effective to prevent further tilting of the mirror 20. In the illustrated embodiment, the limit stop means takes the form of engagement between the tilted glass and a surface of the housing 10. If the driver continues to energize either of the drive motor 70 or 72 after that limit position is reached, worm 82 or 98 continues to rotate. Yet, drive arm 52 or 44 is effectively prevented from rotating further in the selected direction by virtue of the assumed engagement of the mirror with the limit stop. Slip clutch means are provided to prevent the development of undue stresses under that condition and to prevent damage to the motor.

Both such slip clutch means take the form of the arms 106 and 108 (and counterpart arms on the other drive arm) which serve essentially as limitedly flexible or resilient cantilever beams. Thus, in response to the development of excessive forces due to either of the above-noted conditions, the forces tending to establish further rotation between the worm and the drive arm result in the establishment of a force between the face of the worm thread and the cam surfaces 112 and 114 to tend to cam those surfaces outwardly from the thread, which is accommodated by flexing of arms 106 and 108. That flexure is sufficient to permit cams 112 and 114 to travel over the crest of the thread and to jump to the next turn of the thread. This operation can repeat, under appropriate continuing conditions, with the coupler 84 continuing to simply step from one thread to the next, repetitively, as long as the continuing excessive force continues to be exerted due either to continuing manual movement of the glass by the driver towards the limit position or due to continuing operation of the drive motor after the mirror glass is at its limit stop position.

The operating parts of the illustrated system are, in commercial preference, constructed of suitable plastic such as nylon, polypropylene, polycarbonate, fluorocarbon, polyethylene, etc. The coupling means 84 and 86 are therefore designed, of whatever selected plastic or other material is employed, to develop an adequate forceful engagement between the cams 112–114 and the thread of the worm 82 to tend to assist in the dampening or prevention of vibration of the mirror glass, while yet providing sufficient flexibility to serve the above described slip clutching function in response to the abnormal application of excessive forces to the drive train of the system.

It will be observed that from an operational standpoint, the tilting of the ball 30 in response to movement of arcuate portions 58 or of arcuate portions 60, in each of four senses, can be accomplished by the provision of but one pair of diagonally disposed actuating arms or pins, such as pins 36–40 or pins 38–42. However, improved clamping against mirror vibration is achieved by the provision of the two pairs of pins.

The embodiment of FIGS. 11 through 20 (which is the preferred embodiment as of the date of the filing of the continuation-in-part application) is majorly similar to the embodiments of FIGS. 1–10. The elements of the second embodiment have been given reference characters like those of the corresponding elements in the first embodiment but with the suffix "a," and reference may be made to the description of the first embodiment for an applicable description of the corresponding elements in the second embodiment, with the exceptions and additions which will be apparent or specifically noted.

The power housing 10a (FIG. 11) is provided with a plurality (representatively three) of projecting slotted tabs 16a through which screws 14a (FIG. 19) may be inserted to engage tapped holes in bosses 18a disposed within the mirror shell 12a. At least one of the screws 14a, such as the upper one of those screws, is so disposed behind the glass case 21a that it is inaccessible when the power housing and mirror are secured within the shell 12a, so as to impede larceny of the mirror and power housing assembly, since the removal of the unit would normally entail the breaking of the glass. The assembling of the mirror and power housing assembly to the shell 12a is, in the illustrated arrangement, performed before the mirror glass 20a is secured within the case 21a, and to facilitate that assembly, an aperture 200 (FIG. 12) is formed in the glass case 21a in an appropriate location so that the assembler may drivingly insert a screw therethrough to engage the upper tab 16a on the housing 10a (FIG. 11) and the corresponding boss 18a in the case 12a. The glass is thereafter secured to the glass case 21a by any suitable means, such as through the use of a pressure-sensitive adhesive.

Figure 16:
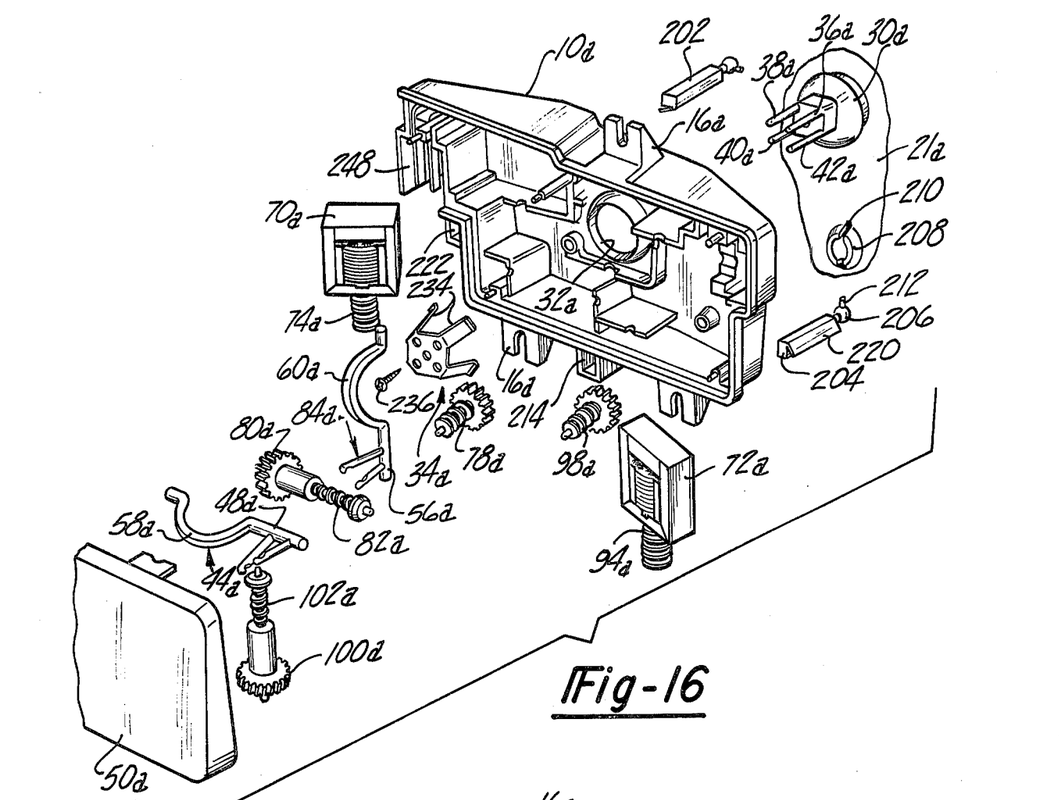
FIG. 16 is an exploded view of the assembly of FIG. 11.
Figure 17:
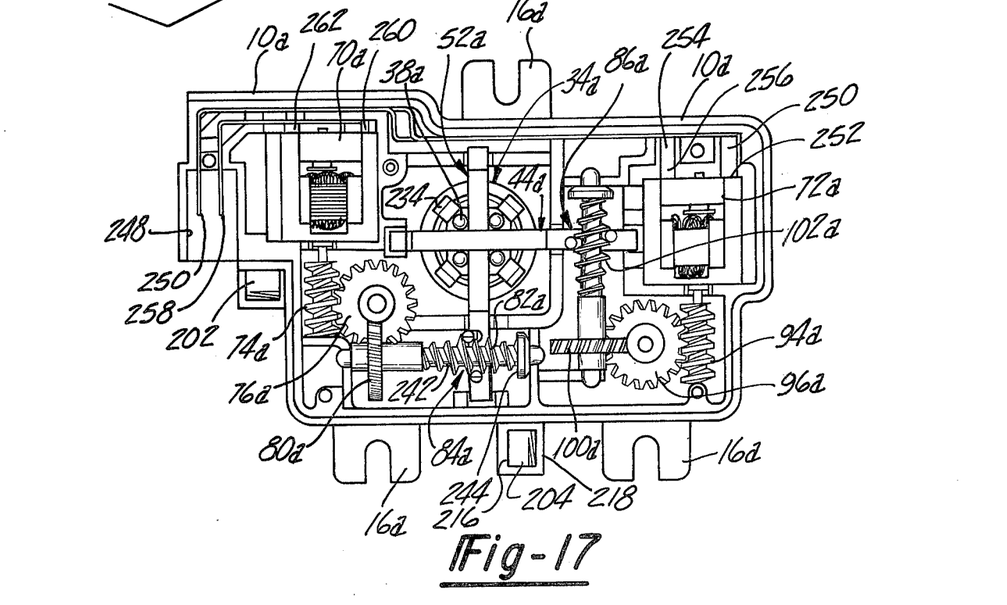
FIG. 17 is an elevational view of the power housing of FIG. 11, with the rear cover removed for clarity of illustration.
Figures 18A, 18B, 19:
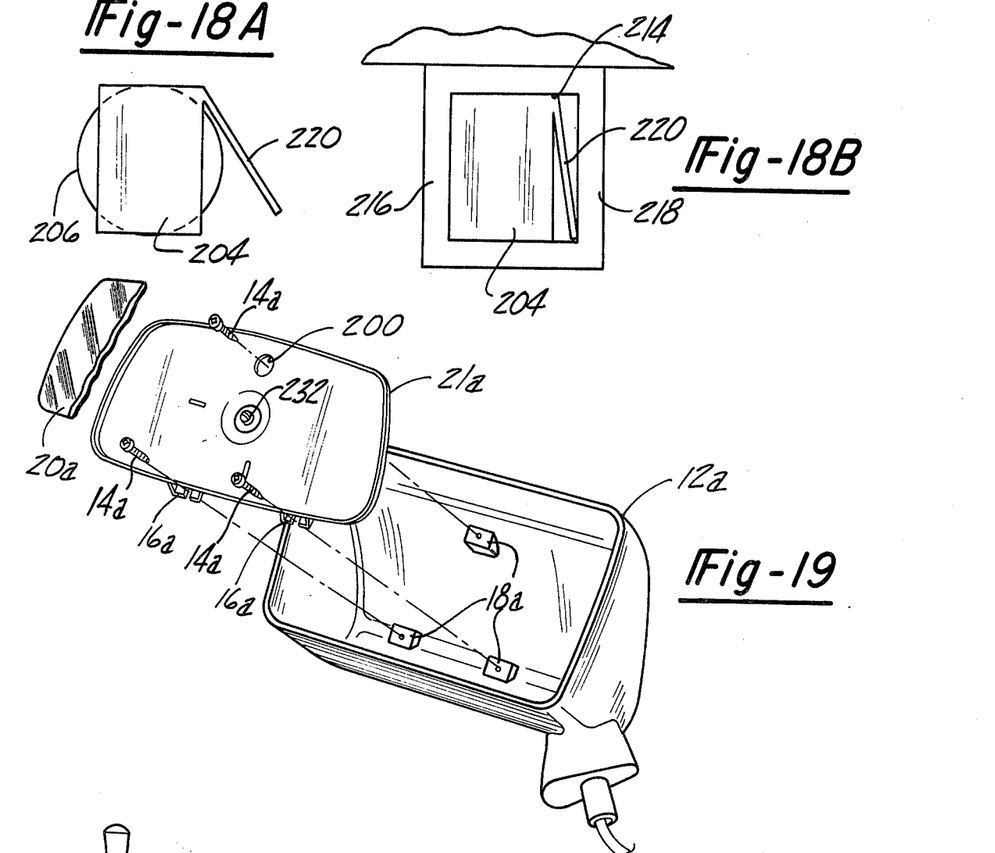
FIG. 18A is an end view of an element of the structure of FIG. 11 illustrated in its free state as manufactured.
FIG. 18B is an end view of a portion of the housing of FIG. 11 together with the element of FIG. 18A disposed therewithin.
FIG. 19 is a separated view of the structure of FIG. 11 in association with a mirror shell.
Figure 20:
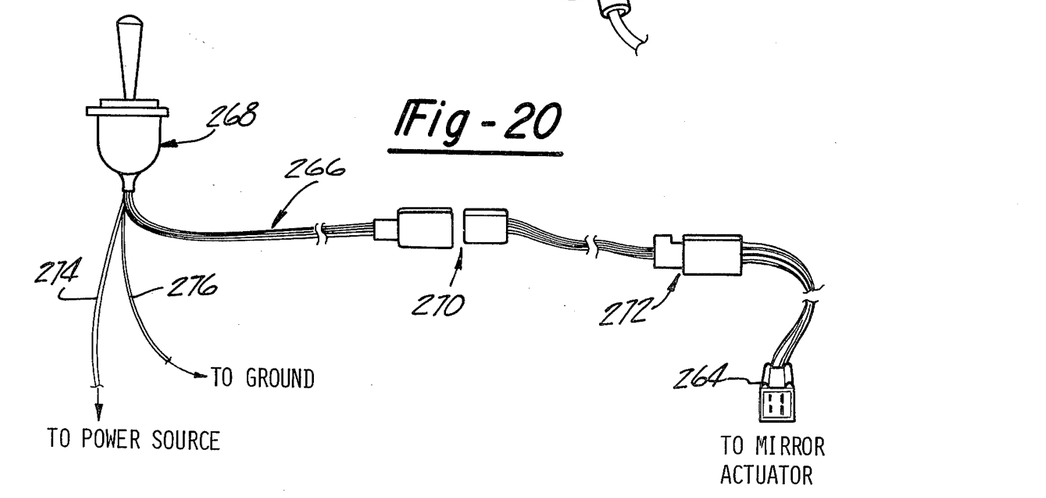
FIG. 20 is a schematic representation of electrical control equipment which can be associated with the assembly of FIG. 11.

Stabilizing means have been added to the second embodiment to insure rigidity of the glass, particularly against high speed vehicular vibration. The stabilizing means is illustrated in the form of a pair of generally rectangular-cross-section bars 202 and 204 (FIG. 16). Bar 204 terminates in a spherical end 206 (FIGS. 16 and 14) which is snap fit in a socket 208 formed integrally with the plastic glass case 21a. The walls of the socket 208 are provided with a diametrical slot 210 to create sufficient flexibility to permit the ball 206 to be snapped and retained therewithin. Ball 206 is provided with an orienting tang 212, engageable in the slot 210, to insure proper orientation of the rectangular (not square) cross-section bar 204.

Bar 204 cooperates with an elongated aperture 214 in a boss formed integrally with the housing 10a (FIG. 16), with that aperture being rectangular in cross section and including a pair of parallel side walls 216 and 218 (FIG. 18B) spaced apart a preselected distance. Bar 204 is provided with an integrally formed flap 220 which extends the length thereof and depends from an edge of the bar 204 and projects therefrom at an appropriate angle, such as 30°. Bar 204 with its integral flap 220 is desirably formed of a suitable plastic material. The width of the bar 204 (FIG. 18A) is substantially less than the distance between the adjacent faces of walls 216 and 218, but the total width of the bar assembly 204 (FIG. 18A) including the flap 220 in its free and unconstrained position is substantially greater than the distance between the adjacent faces of walls 216 and 218. Accordingly, as may be seen in FIG. 18B, when the flap 220 is pressed inwardly and the bar 204 inserted within the aperture 214, flap 220 is bent from its free position, resiliently opposing that bending. As a result, flap 220 forcibly engages the inner surface of wall 214, forcing the opposite wall of bar 204 into frictional engagement with the adjacent surface of wall 216 so as to establish a controlled frictional engagement between the bar 204 and the walls of the aperture 214 to restrain relative movement therebetween and hence to dampen any tendency of the mirror and glass to vibrate. The frictional force is not, of course, sufficient to impede purposeful tilting of the glass either by manual pressure on the face of the glass or through electrical actuation.

A corresponding bar 202 cooperates with an aperture 222 (FIG. 16) mounted on the housing 10a and cooperates therewith in a corresponding manner.

In the embodiment of FIGS. 11–20, the mirror case 21a (FIG. 13) is associated with the movable pivot member 30a through attachment means 28a in the form of a tubular projection from the body of the ball or movable pivot 30a, surrounding a central drilled post 226. The face of the plastic glass case 21a adjacent the housing is provided with a shallow recess 228 accepting the end of the attachment means 28a. As may best be seen in FIG. 12, the end of the tubular attachment means 28a is recessed along an area defined by a cord 230 slightly spaced from the center of the cylinder and the back of the glass case is similarly conformed so as to orient the glass case with reference to the movable pivot member 30a and to prevent relative rotation therebetween. A screw 232 passes through an aperture in the mirror case 21a and engages the aperture in the central post 226 to secure the glass case to the movable pivot element. It is contemplated that the glass 20a will be glued or otherwise secured in place on the mirror case 21a after the screw 232 is seated.

A spring 34a (FIG. 16) having a central portion and four splayed depending legs 234, is secured, such as by a screw 236 (FIGS. 13 and 16) to the movable pivot element 30a, screw 236 passing through a central aperture in the base of spring 34a and threadedly engaging an aperture formed in the central inner portion of the pivot 30a. The arms 234 ride against a surface 238 on the inner face of the housing 10a (FIGS. 13 and 17), and specifically upon a portion of that surface serving to define the socket member 32a. Accordingly, the spring arms 234 ride against the generally spherical surface and exert a continuing force tending to pull movable pivot element 30a into engagement with the mating surface of the fixed pivot portion 32a, assisting to establish a barrier against the entry of water and dirt into the housing. Except for that sliding frictional joint between the ball and socket elements 30a and 32a, the housing 10a is effectively sealed.

Worms 82a and 102a (FIGS. 15 and 17) have been modified from their counterparts in the embodiments of FIGS. 1–10 primarily in two ways. First, in the embodiment of FIGS. 1–10, the limit positions to the tilting movement of the glass in each sense (up, down, left, right or approximately along each diagonal) was established by engagement between the glass case 21a and the housing 10a. In the embodiment of FIGS. 11–20, that limit stop is established by engagement within the drive train. Thus, a shoulder 242 is formed at the left end of the thread of worm 82a and a shoulder 244 is formed at the right end thereof. The limit stop is established by the engagement of the worm follower mechanism 84a with each of those two shoulders. Corresponding shoulders adjacent the ends of the thread on worm 102a constitute the limits in other senses of movement.

The clutching function has been previously described. In the embodiment of FIGS. 1–10, the clutching means was designed to effectively slip if the forces exceeded a preselected value. That preselected value was selected to be high enough to insure proper operation of the mirror while yet protecting against excessive loads either due to shifting of the glass by the application of the forces directly to the surface of the glass or due to continuing electrical energization after the mirror reached a limit position. An improvement has been effected by selectively modifying the magnitude of the preselected force at which the clutch will slip as a function of the angular position (in any sense) of the mirror. Thus, the end 1½ turns of the thread of the worm 82a have been gradually tapered in diameter from the full diameter down to the root diameter at a point adjacent the shoulders 242 and 244. As a result, the preselected force at which the clutch will slip is kept at a constant reasonably high value over the major portion of the angles of tilting of the mirror up to a point proximate the limit positions of the mirror. In that final angular movement (reflecting about 1½ turns of the worm 82a) between that proximate point and the limit point, the applied force at which the clutch will slip is progressively diminished. This has the practical advantage that if the mirror continues to be electrically actuated after it has reached its limit position, the continuing perrevolution clutching will produce a smaller magnitude of signalling pulsation of the glass surface, will produce less audible noise, and will produce less wear on the clutch parts. Similar considerations apply to the construction of the thread on worm gear 102a.

Housing 10a (FIGS. 16 and 17) has been provided with a hollow extension defining (in cooperation with the cover 50a) a socket 248 of generally rectangular cross section and opening downwardly. An electrical connection means, in the form of the terminating end of a metallic strip 250, projects into socket 248 and extends through slots formed therefor in the molded plastic housing 10a to terminal 252 of motor 72a. A corresponding strip 254 underlies 250 (in the view of FIG. 17) and follows a corresponding course but terminates at terminal 256 of motor 272a. Correspondingly a metallic strip 258 terminates within socket 248 and extends to terminal 260 of motor 70a, and a corresponding strip, underlying strip 258 (in the view of FIG. 17), extends to terminal 262 of motor 70a. Thus, there are four terminating metallic-strip ends projecting into the socket 248, serving the function of an electrical jack. A four terminal electric plug 264 (FIG. 20) is designed to be insertable in socket 248 and to be, if desired, selectively lockable therewithin. Plug 264 serves the function of establishing an electrical connection between the four terminating ends of the connection means in socket 248 with a four wire cable 266 extending to the switch 268, which may be of the form previously described. A selectively detachable connector, such as a plug and jack coupling 270 may be inserted in the cable 266 at a point closely proximate the switch 268, and, if desired, a further selectively detachable electrical connector assembly 272 may be disposed in the cable at any intermediate point to facilitate installation of the cabling in a vehicle. Conductors 274 and 276 may extend from any suitable point in the electrical system, such as from the switch, to battery and ground, respectively. It will be perceived that by virtue of the inclusion of the selectively detachable connection means, the switch 268, if it becomes defective, may be replaced, by disconnecting it at connector 270, without replacing the major portion of the cabling and without replacing any portion of the mirror assembly. Similarly, if the mirror and power housing assembly becomes defective, the plug 264 may be removed from the socket 248 after disassociating the housing 10a from the shell 12a as previously described, and a replacement unit installed.

What is claimed is:

1. In a vehicular remote control outside rearview mirror assembly, first and second cooperating pivot assembly portions, said first pivot portion being rotatable through an angle about each of two mutually perpendicular axes relative to said second portion, a reflective mirror member, means for supporting said reflective mirror member on said first pivot portion for rotation therewith, selectively operable drive means, first and second generally arcuate drive arm means each selectively rotatable through an angle about substantially perpendicular axes by said selectively operable drive means, said drive means including a pair of worms, each rotatable about an individual worm axis, and a worm follower individual to each of said worms and rotatable by the respective worm about an axis spaced from the worm axis of the worm individual thereto, and actuating arm means secured to said first pivot portion and in driving engagement with said first and second drive arm means and effective when selectively driven by said drive arm means to rotate said first pivot portion.

2. The combination of claim 1 in which said first drive arm means when rotated through an angle by said selectively operable drive means drives said actuating arm means through an angle in one plane and in which said second drive arm means when rotated through an angle by said selectively operable drive means drives said actuating arm means through an angle in a plane substantially perpendicular to said one plane.

3. The combination of claim 1 in which said selectively operable drive means includes an electric motor and a drive train driven by said motor, and in which each of said worm followers is integral with a respective one of said drive arm means.

4. The combination of claim 1 in which said selectively operable drive means includes a first selectively operable electric motor for powering rotational motion of said reflective mirror member about one axis, a second selectively operable electric motor for powering rotational motion of said reflective mirror member about an axis substantially perpendicular to said one axis, and individual drive train means driven by each of said motors.

5. The combination of claim 1 in which said actuating arm means comprises a pair of actuating arms secured to said first portion and extending in substantial parallelism therefrom and firmly clasping a portion of one of said drive arm means, said actuating arm having an interference fit with said drive arm and being limitedly resilient and at least one thereof being resiliently deflected from the free position thereof by said drive arm, rotation of said drive arm through an angle in either of two directions applying rotational forces through at least one of said actuating arms to said first pivot portion.

6. In a vehicular remote control outside rearview mirror assembly, first and second cooperating pivot assembly portions, said first pivot portion being rotatable through an angle about a first axis, a generally arcuate drive arm rotatable through an angle about an axis parallel with said first axis, and a pair of actuating arms secured to said first portion and extending in substantial parallelism therefrom and firmly clasping a portion of said arcuate drive arm therebetween for restraining relative rotation between said actuating arms and said drive arm about said axes, said actuating arms having an interference fit with said drive arm and being limitedly resilient and at least one thereof being resiliently deflected from the free position thereof by said drive arm, rotation of said drive arm through an angle in either of two directions applying rotational forces through at least one of said actuating arms to said first pivot portion.

7. The combination of claim 6 further including further means for rotating said actuating arms relative to said drive arm through an angle about a second axis substantially perpendicular to said first axis.

8. The combination of claim 7 in which said further means comprises a second generally arcuate drive arm rotatable through an angle about an axis parallel with said second axis.

9. The combination of claim 8 in which said pair of actuating arms firmly clasps a portion of said second arcuate drive arm therebetween, said actuating arms having an interference fit with said second drive arm and being limitedly resilient and at least one thereof being resiliently deflected from the free position thereof by said second drive arm, rotation of said second drive arm through an angle in either of two directions applying rotational forces through at least one of said actuating arms to said first pivot portion.

10. The combination of claim 8 further including a second pair of actuating arms secured to said first portion and extending in substantial parallelism therefrom and firmly clasping a portion of said second arcuate drive arm therebetween for restraining relative rotation between said actuating arm and said second drive arm, said second pair of actuating arms having an interference fit with said second drive arm and being limitedly resilient and at least one thereof being resiliently deflected from the free position thereof by said second drive arm, rotation of said second drive arm through an angle in either of two directions applying rotational forces through at least one of said second pair of actuating arms to said first pivot portion.

11. In a vehicular remote control outside rearview mirror assembly, first and second cooperating pivot assembly portions, said first portion being rotatable unless restrained through an angle about each of first, second and third mutually perpendicular axes relative to said second portion, and means for selectively pivoting said first pivot portion about at least one of said first and second axes while preventing rotation of said first portion about said third axis comprising a first generally arcuate drive arm rotatable about an axis parallel with said first axis, a pair of actuating arms secured to said first portion and extending in substantial parallelism therefrom and clasping a portion of said arcuate drive arms therebetween, and means for selectively rotating said drive arm.

12. The combination of claim 11 further including means including a second generally arcuate drive arm rotatable about an axis parallel with said second axis for rotating said first pivot portion about said second axis.

13. In a vehicular remote control outside rearview mirror assembly, a housing, a fixed pivot assembly portion on said housing and having a central aperture therethrough extending through a wall of said housing, a movable pivot assembly portion seatably engaging said fixed pivot assembly portion and tiltable in plural directions with respect thereto, attachment means on a portion of said movable pivot assembly portion exterior of said housing, a reflective mirror member, means for securing said reflective mirror member to said attachment means, actuating arm means on said movable assembly portion and projecting within said housing through said central aperture in said fixed pivot assembly portion, force transmitting means, drive means within said housing engageable with said actuating arm means for exerting forces thereon to tilt said movable pivot assembly portion relative to said fixed pivot assembly portion, spring means continuously exerting a force on said movable pivot portion in a direction to seat said movable pivot portion on said fixed pivot portion, said spring means having a plurality of arm portions engaging said housing and a central portion engaging said movable pivot assembly portion.

14. The combination of claim 13 further including means for securing said arm portions to said housing, said central portion being slidably engageable with said movable pivot assembly portion.

15. The combination of claim 13, further including means for securing said central portion to said movable pivot assembly portion, said arm portions being slidably engageable with portions of said housing.

16. The combination of claim 15 in which said spring means is disposed within said housing in which said arm portions are slidably engageable with portions of said housing constituting portions of said fixed pivot assembly portion.

* * * * *